(12) United States Patent
Hikita (10) Patent No.: US 11,560,018 B2
(45) Date of Patent: *Jan. 24, 2023

(54) TYRE

(71) Applicant: Sumitomo Rubber Industries, Ltd., Kobe (JP)

(72) Inventor: Masahiro Hikita, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 341 days.

This patent is subject to a terminal disclaimer.

(21) Appl. No.: 16/793,727

(22) Filed: Feb. 18, 2020

(65) Prior Publication Data

US 2020/0282774 A1 Sep. 10, 2020

(30) Foreign Application Priority Data

Mar. 5, 2019 (JP) .............................. JP2019-039631

(51) Int. Cl.
*B60C 11/03* (2006.01)
*B60C 11/117* (2006.01)
*B60C 11/13* (2006.01)

(52) U.S. Cl.
CPC ............ *B60C 11/03* (2013.01); *B60C 11/032* (2013.01); *B60C 11/1307* (2013.01);
(Continued)

(58) Field of Classification Search
CPC .............. B60C 11/032; B60C 11/0323; B60C 2011/0358; B60C 2011/036;
(Continued)

(56) References Cited

U.S. PATENT DOCUMENTS 2,327,057 A * 8/1943 Ofensend .............. B60C 11/042
152/209.21
2012/0216929 A1* 8/2012 Matsunami ......... B60C 11/0302
152/209.11
(Continued)

FOREIGN PATENT DOCUMENTS

CN 104029567 A * 9/2014
EP 1 508 456 A2 2/2005
(Continued)

OTHER PUBLICATIONS

Machine Translation: CN-104029567-A, Chen X, (Year: 2022).*
(Continued)

*Primary Examiner* — Kendra Ly
(74) *Attorney, Agent, or Firm* — Birch, Stewart, Kolasch & Birch, LLP (57) ABSTRACT

To improve uneven wear resistance performance while maintaining drainage performance. A tyre is provided with a plurality of inclined grooves in a tread portion. Each of the inclined grooves includes a first portion arranged on a crown region side, a second portion arranged on a shoulder region side, and a third portion connecting between the first portion and the second portion. In a ground contacting surface of the tread portion, the third portion has a groove width smaller than the first portion and the second portion. The third portion includes an outer portion arranged on the ground contacting surface side and an inner portion arranged radially inside the outer portion. The inner portion has a groove width larger than the outer portion.

19 Claims, 7 Drawing Sheets

(52) U.S. Cl.
CPC ............... *B60C 2011/0365* (2013.01); *B60C 2011/0367* (2013.01); *B60C 2011/0372* (2013.01); *B60C 2011/0376* (2013.01); *B60C 2011/0379* (2013.01); *B60C 2200/10* (2013.01)

(58) Field of Classification Search
CPC ..... B60C 2011/0362; B60C 2011/0365; B60C 2011/0367; B60C 2011/0369; B60C 2011/0372; B60C 2011/0374; B60C 2011/0376; B60C 2011/0379
See application file for complete search history.

(56) References Cited

U.S. PATENT DOCUMENTS

| | | | |
|---|---|---|---|
| 2014/0130950 A1 | 5/2014 | Guichon | |
| 2014/0158260 A1* | 6/2014 | Kuwahara | B60C 11/0304 152/209.8 |
| 2014/0190607 A1* | 7/2014 | Matsunami | B60C 11/1369 152/209.11 |
| 2017/0120692 A1* | 5/2017 | Durand-Gasselin | B60C 11/24 |

FOREIGN PATENT DOCUMENTS

| | | | | |
|---|---|---|---|---|
| GB | 1549347 A | * | 8/1979 | ......... B60C 11/0309 |
| GB | 2 114 069 A | | 8/1983 | |
| GB | 2114069 A | * | 8/1983 | ......... B60C 11/0302 |
| JP | 2007223569 A | * | 9/2007 | ......... B60C 11/0058 |
| JP | 2010-111163 A | | 5/2010 | |
| JP | 6149032 B2 | | 6/2017 | |

OTHER PUBLICATIONS

Machine Translation: JP-2007223569-A, Kajimoto K, (Year: 2022).*
Extended European Search Report for European Application No. 20153809.7, dated Jul. 3, 2020.

* cited by examiner

TYRE

TECHNICAL FIELD

The present invention relates to a tyre.

BACKGROUND ART

Patent Document 1 below has described a tyre having a groove in a tread portion. The groove mentioned above includes a pair of side surfaces facing each other along the lateral direction, a radially outer portion extending between the pair of the side surfaces, and a radially inner portion fluidically connected to the radially outer portion. The radially inner portion includes a space formed by a pair of expanded side walls.

PRIOR ART DOCUMENT

Patent Document

[Patent Document 1]
Japanese Patent No. 6149032

SUMMARY OF THE INVENTION

Problems to be Solved by the Invention

In recent years, due to the development of the highway network, straightaway driving time has been increasing. In addition, driving speed has been increasing due to the improved performance of vehicles. For this reason, there has been a problem that a specific area of the tyre is worn a lot. Further, there has been a demand for maintaining drainage performance so that the hydroplaning phenomenon does not occur even at a high driving speed.

The present invention was made in view of the above, and a primary object thereof is to provide a tyre capable of improving uneven wear resistance performance while maintaining the drainage performance.

Means for Solving the Problems

The present invention is a tyre including a tread portion and the tread portion is provided with a plurality of inclined grooves inclined with respect to a tyre circumferential direction, each of the inclined grooves includes a first portion arranged on a crown region side, a second portion arranged on a shoulder region side, and a third portion connecting between the first portion and the second portion, in a ground contacting surface of the tread portion, the third portion has a groove width smaller than the first portion and the second portion, the third portion includes an outer portion arranged on the ground contacting surface side and an inner portion arranged radially inside the outer portion, and the inner portion has a groove width larger than the outer portion.

In the tyre according to the present invention, it is preferred that the groove width of the inner portion gradually increases radially inwardly.

In the tyre according to the present invention, it is preferred that the third portion extends linearly.

In the tyre according to the present invention, it is preferred that in terms of a groove depth, the outer portion is 30% or more of the third portion.

In the tyre according to the present invention, it is preferred that in terms of a groove depth, a groove width of the third portion is 80% or more and 120% or less of the first portion and the second portion.

In the tyre according to the present invention, it is preferred that a lateral cross section of the outer portion is line symmetric with respect to a groove center line of the third portion.

In the tyre according to the present invention, it is preferred that in terms of a groove width, the outer portion is 60% or less of the first portion and the second portion.

In the tyre according to the present invention, it is preferred that a length in a tyre axial direction of the third portion is 5% or more of a tread width.

In the tyre according to the present invention, it is preferred that the inclined grooves include at least one first inclined groove and at least one second inclined groove having a length smaller than the first inclined groove.

In the tyre according to the present invention, it is preferred that the first portion of the first inclined groove reaches a tyre equator, and the first portion of the second inclined groove does not reach the tyre equator.

Effects of the Invention

In the tyre according to the present invention, the tread portion is provided with a plurality of the inclined grooves. Each of the inclined grooves maintains the tread rigidity high and improves the uneven wear resistance performance in the vicinity thereof owing to the third portion having the small groove width. Further, the third portion is connected with the first portion and the second portion, therefore, slippage when the first portion and the second portion are in contact with the ground is effectively suppressed, thereby, the uneven wear resistance performance is further improved.

The first portion and the second portion of each of the inclined grooves have the large groove widths on the ground contacting surface of the tread portion, therefore, excellent drainage performance is provided. Further, the third portion includes the outer portion arranged on the ground contacting surface side and the inner portion arranged radially inside the outer portion, and the inner portion is formed to have the groove width larger than the outer portion. The third portion configured as such maintains the tread rigidity on the ground contacting surface side by the outer portion thereof and the groove volume of the inner groove is increased while the uneven wear resistance performance is improved, therefore, it is possible that the drainage performance is maintained.

Thereby, the tyre according to the present invention improves the uneven wear resistance performance while maintaining the drainage performance.

MODE FOR CARRYING OUT THE INVENTION

An embodiment of the present invention will now be described in conjunction with accompanying drawings.

Figure 1:
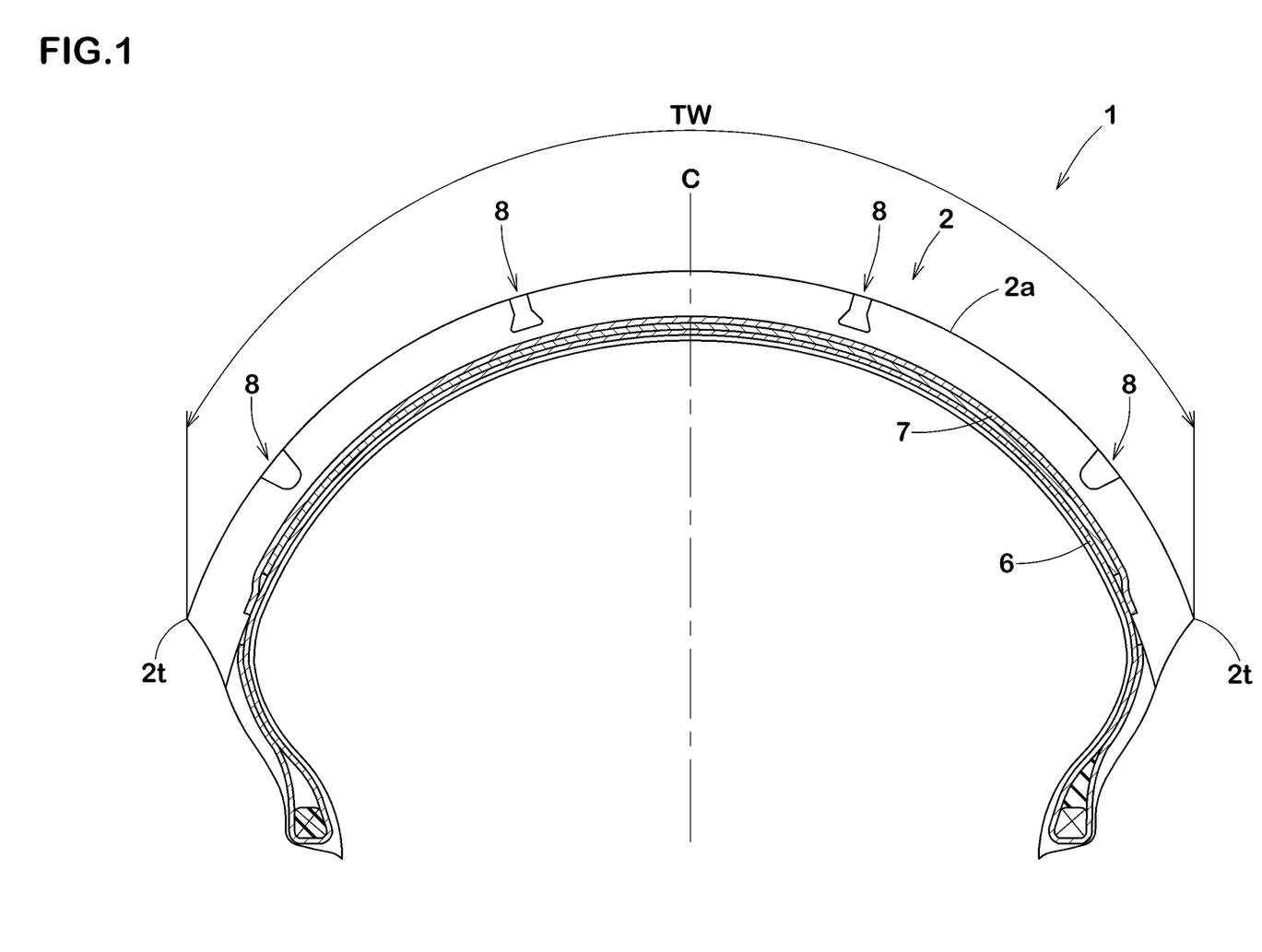
FIG. 1 a tyre meridian section of a tyre according to an embodiment of the present embodiment.

FIG. 1 is a tyre meridian section passing through a tyre rotational axis (not shown) of a tyre 1 according to the present embodiment in a standard state. In FIG. 1, the pneumatic tyre 1 for a motorcycle is shown, for example. However, the present invention is not limited to the tyre 1 configured as such, and may be applied to a pneumatic tyre 1 for passenger cars and for heavy loads, as well as a non-pneumatic tyre 1 that is not filled with air, for example.

The "standard state" is a state in which the tyre 1 is mounted on a standard rim (not shown), inflated to a standard inner pressure, and loaded with no tyre load. In this specification, dimensions and the like of various parts of the tyre are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

In the tyre 1 of the present embodiment, a ground contacting surface (2a) defined between tread edges (2t), (2t) of a tread portion 2 extends in a curved arc shape protruding outward in a tyre radial direction. In the tyre 1 configured as such, a sufficient ground contacting area can be obtained even during cornering with a large camber angle. In this specification, a distance in a tyre axial direction between the tread edges (2t), (2t) when the tread portion 2 is developed into a plane is defined as a tread width (Tw).

The tread portion 2 of the tyre 1 of the present embodiment has a carcass 6 and a tread reinforcing layer 7 disposed therein. Each of the carcass 6 and the tread reinforcing layer 7 are formed as a cord ply in which a plurality of cords is arranged and covered with a topping rubber, for example.

Figure 2:
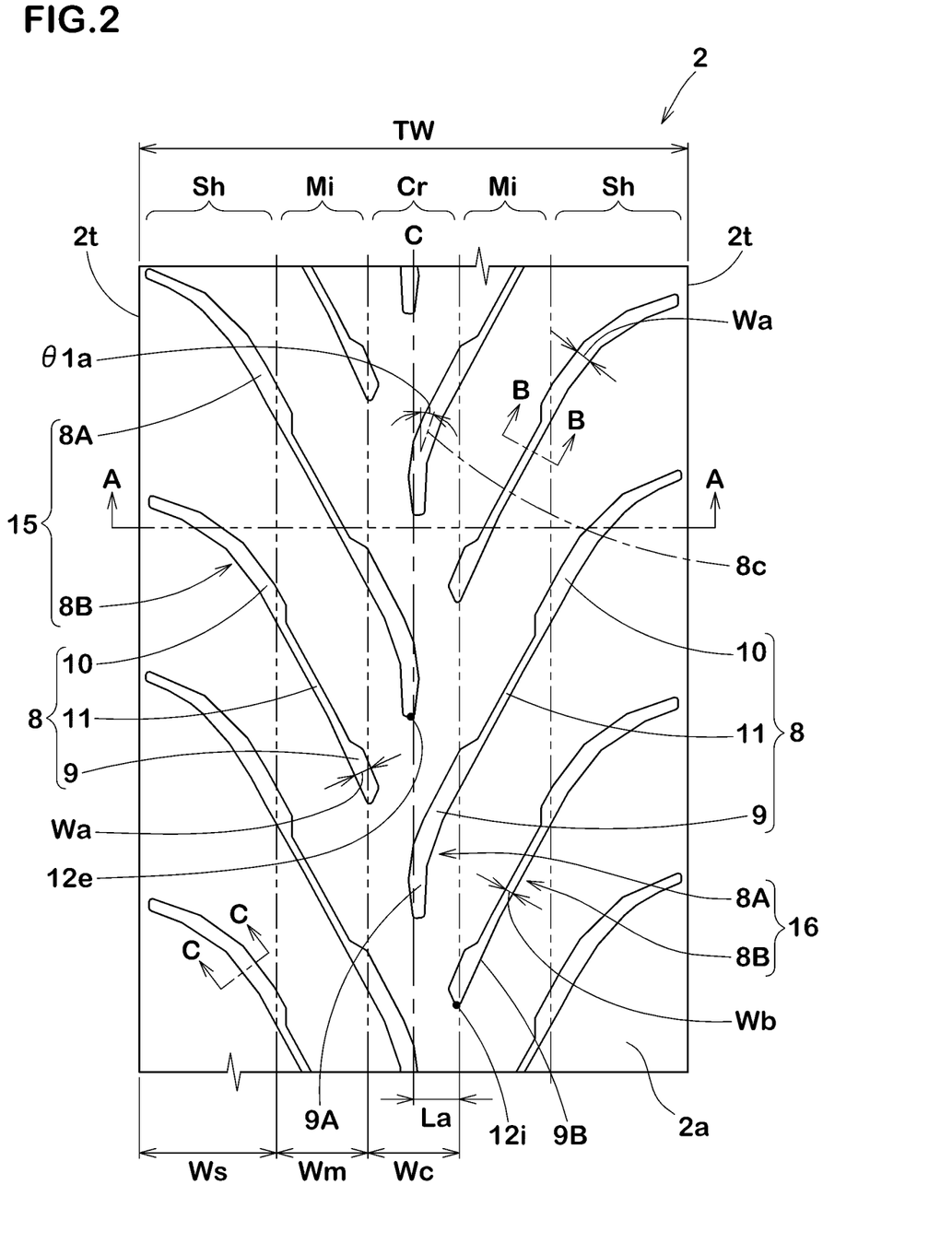
FIG. 2 a development view of the tread portion of the tyre of FIG. 1.

FIG. 2 is a development view of the tread portion 2 of the tyre 1 of the present embodiment. A cross section taken along A-A line of FIG. 2 is shown in FIG. 1. As shown in FIG. 2, the tread portion 2 of the present embodiment includes a crown region (Cr) including a tyre equator (C), a pair of middle regions (Mi), (Mi) disposed on both sides of the crown region (Cr), and a pair of shoulder regions (sh), (sh) each arranged axially outside a respective one of the middle regions (Mi). The crown region (Cr) and the middle regions (Mi) are the regions which are to be in contact with a flat plane (not shown) when the tyre 1 in the standard state is loaded with a tyre load of 1.5 kN with zero camber angle. Both regions (Cr) and (Mi) are the regions which generally contact with the ground during straightaway driving. Note that each of the middle regions (Mi) has a smaller length in a tyre circumferential direction than that of the crown region (Cr), therefore, the amount of wear due to slip tends to be increased. The shoulder regions (sh) include the tread edges (2t), and are the regions which come into contact with the ground during cornering when the camber angle becomes maximum.

Although not particularly limited, a width (Wc) in the tyre axial direction of the crown region (Cr) is 10% or more and 20% or less of the tread width (Tw), for example. A width (Wm) in the tyre axial direction of each of the middle regions (Mi) is 15% or more and 20% or less of the tread width (Tw), for example. A width (Ws) in the tyre axial direction of each of the shoulder regions (Sh) is 20% or more and 30% or less of the tread width (Tw), for example.

The tread portion 2 of the present embodiment is provided with a plurality of inclined grooves 8 inclined with respect to the tyre circumferential direction. Thereby, high drainage performance is exerted.

Each of the inclined grooves 8 includes a first portion 9 arranged on a side of the crown region (Cr), a second portion 10 on a side of a corresponding one of the shoulder regions (sh), and a third portion 11 connecting between the first portion 9 and the second portion 10. In the ground contacting surface (2a) of the tread portion 2, the third portion 11 has a groove width (Wb) smaller than the first portion 9 and the second portion 10. The third portion 11 configured as such suppresses the slip that occurs mainly in the tyre circumferential direction in the first portion 9 and the second portion 10 upon contacting the ground while maintaining tread rigidity high, therefore, the uneven wear resistance performance is improved. In particular, in the case in which the cords of the tread reinforcing layer 7 are arranged at zero degrees with respect to the tyre equator (C), the effect of suppressing slip in the tyre circumferential direction is increased. Since the first portion 9 and the second portion 10 have a large groove width (Wa), the drainage performance is maintained high.

Figure 3:
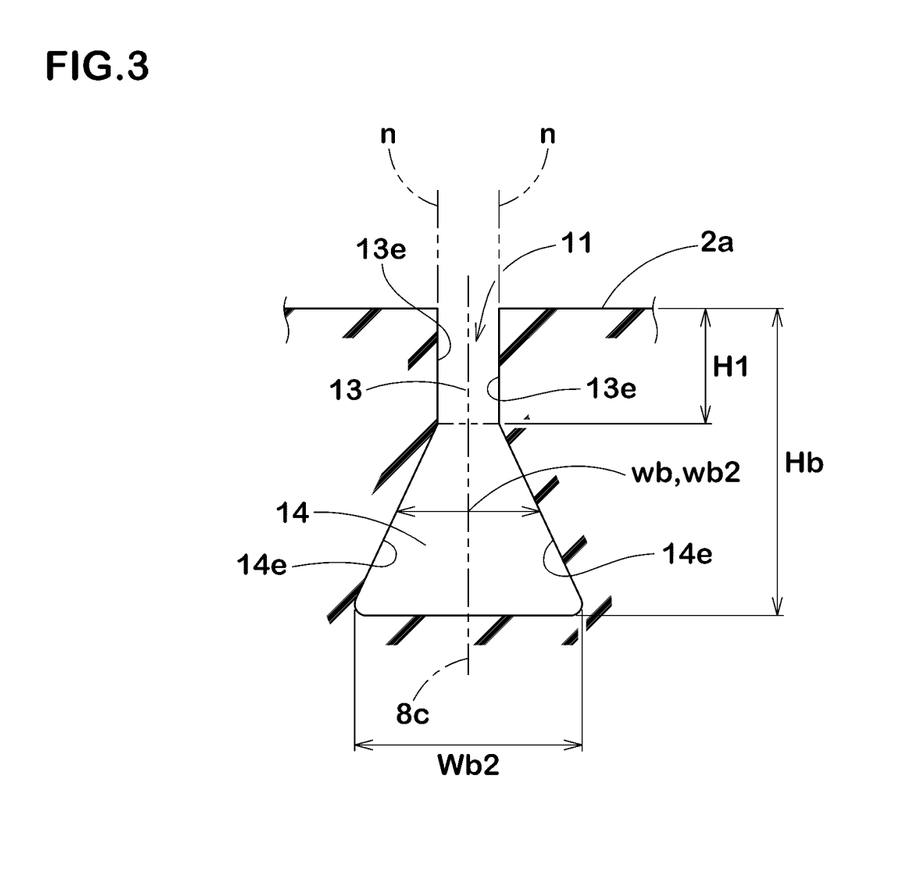
FIG. 3 a cross-sectional view taken along B-B line of FIG. 2.

FIG. 3 is a cross-sectional view taken along B-B line of FIG. 2. In FIG. 3, a lateral cross-sectional view taken perpendicular to a longitudinal direction of the third portion 11 is shown. As shown in FIG. 3, the third portion 11 includes an outer portion 13 arranged on a side of the ground contacting surface (2a) and an inner portion 14 arranged radially inside the outer portion 13. The inner portion 14 is formed to have a groove width (Wb) larger than the outer portion 13. In the third portion 11 configured as such, the inner portion 14 has an increased groove volume, therefore, the drainage performance is maintained high, and the outer portion 13 suppresses the decrease in the tread rigidity, therefore, the uneven wear resistance performance is increased.

The third portion 11 in the present embodiment has a lateral cross section formed in a flask shape. In the outer portion 13 of the present embodiment, both groove walls (13e), (13e) extend along normal lines (n) respectively. In the inner portion 14 of the present embodiment, both groove walls (14e), (14e) extend in a tapered shape toward the outside in the tyre radial direction. In other words, a groove width (Wb2) of the inner portion 14 is gradually and smoothly increased toward the inside in the tyre radial direction. The third portion 11 configured as such secures the groove volume while effectively increases the tread rigidity of tread portion 2 on the side of the ground contacting surface (2a), therefore, the uneven wear resistance performance is further improved while the drainage performance is maintained higher. The normal line (n) is a straight line orthogonal to the tangent of the ground contacting surface (2a) at the intersection of the ground contacting surface (2a) and the groove wall (13e).

The outer portion 13 has a line-symmetric shape with respect to a groove center line (8c) of the third portion 11, for example. The outer portion 13 configured as such maintains the tread rigidity high. In particular, in the case in which the groove width (Wb) of the third portion 11 at the ground contacting surface (2a) is formed small, the groove walls (13e), (13e) firmly support each other during contacting the ground, therefore, effect of suppressing the slip in the middle regions (Mi) is increased. In the present embodiment, the inner portion 14 is also line-symmetric with respect to the groove center line (8c). In this specification, the groove center line is a line segment connecting the middle points of the groove width.

In the present embodiment, the groove walls (13e) of the outer portion 13 and the groove walls (14e) of the inner portion 14 extend linearly in the tyre radial direction. It should be noted that the groove walls (13e) and (14e) are not limited to such a configuration, and they may extend in an arc shape or a wavy shape, for example.

It is preferred that a depth (H1) of the outer portion 13 is 30% or more of a groove depth (Hb) of the third portion 11. When the depth (H1) of the outer portion 13 is less than 30% of the groove depth (Hb) of the third portion 11, the tread rigidity is decreased, therefore, it is possible that the uneven wear resistance performance is deteriorated. It is preferred that the depth (H1) of the outer portion 13 is 50% or less of the groove depth (Hb) of the third portion 11. When the depth (H1) of the outer portion 13 is more than 50% of the groove depth (Hb) of the third portion 11, the groove volume of the inner portion 14 is decreased, therefore, it is possible that the drainage performance is deteriorated.

It is preferred that a maximum groove width (Wb2) of the inner portion 14 is 2.0 times or more and 3.0 times or less the groove width (Wb) of the ground contacting surface (2a).

As shown in FIG. 2, the inclined grooves 8 include inclined grooves 15 on one side and inclined grooves 16 on the other side, for example. In the present embodiment, the inclined grooves 15 on one side extend from the crown region (Cr) toward one of the shoulder regions (sh) on one side (left side in the figure) in the tyre axial direction. In the present embodiment, the inclined grooves 16 on the other side extend from the crown region (Cr) toward one of the shoulder regions (sh) on the other side (right side in the figure) in the tyre axial direction. The inclined grooves 15 on one side and the inclined grooves 16 on the other side in the present embodiment are alternately arranged in the tyre circumferential direction.

In the present embodiment, the inclined grooves 8 include first inclined grooves (8A) and second inclined grooves (8B) having lengths smaller than those of the first inclined grooves 8A. The first inclined grooves (8A) and the second inclined grooves (8B) are alternately arranged in the tyre circumferential direction, for example.

The first portions (9A) of the first inclined grooves (8A) reach the tyre equator (C), and the first portions (9B) of the second inclined grooves (8B) do not reach the tyre equator (C). The inclined grooves 8 configured as such suppress a large decrease in the tread rigidity on the tyre equator (C) where a large ground contact pressure is applied to, therefore, the uneven wear resistance performance is maintained. In the present embodiment, the first portions (9A) of the first inclined grooves (8A) have lengths greater than the first portions (9B) of the second inclined grooves (8B).

Inner ends (12e) of the first inclined grooves (8A) are located on the tyre equator (C), for example. A distance (La) in the tyre axial direction between inner ends (12i) of the second inclined grooves (8B) and the tyre equator (C) is 5% or more and 10% or less of the tread width (Tw), for example. Thereby, the effects described above are effectively exerted.

In the present embodiment, each of the first portions 9 extends over the crown region (Cr) and one of the middle regions (Mi). The first portions 9 configured as such quickly discharge water on the crown region (Cr) where water is difficult to be drained. In the present embodiment, each of the first portions 9 of the first inclined grooves (8A) has a length in the tyre axial direction larger than a half of the width (Wc) of the crown region (Cr).

The first portions (9A) of the first inclined grooves (8A) are inclined so that the angles (01a) with respect to the tyre circumferential direction increases axially outwardly, for example. The first portions (9B) of the second inclined grooves (8B) extend linearly, for example. In this specification, the angle of each of the inclined grooves 8 is measured at the groove center line (8c) thereof.

In the present embodiment, each of the second portions extends over one of the shoulder regions (sh) and its adjacent one of the middle regions (Mi). The second portions 10 configured as such improve the drainage performance during cornering. The second portions 10 in the present embodiment terminate within the shoulder regions (sh) without being connected to the tread edges (2t). Thereby, the tread rigidity on sides of the tread edges (2t) is maintained high.

Figure 4:
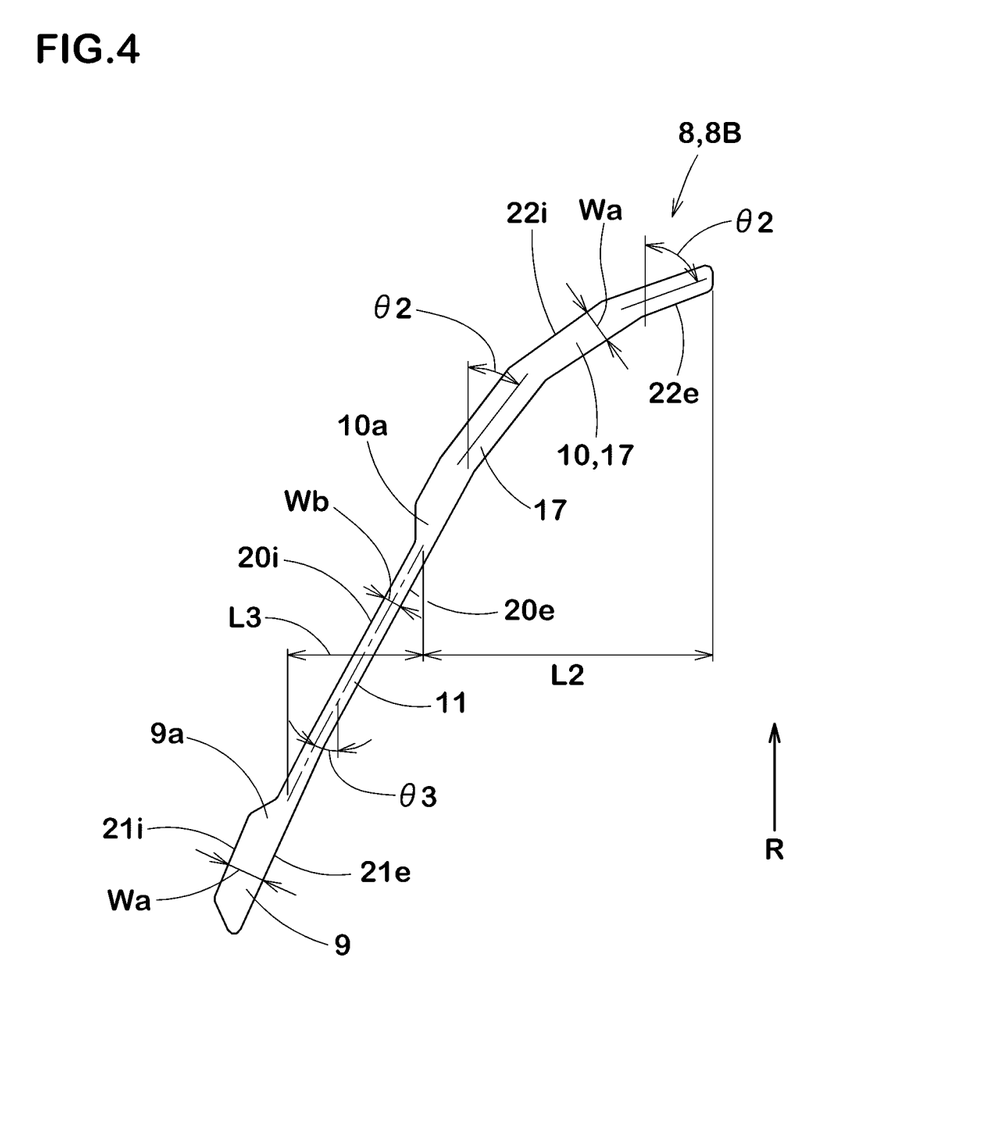
FIG. 4 an enlarged view of the inclined groove.

FIG. 4 is an enlarged view of the inclined groove 8. As shown in FIG. 4, the second portion 10 in the present embodiment is formed by a plurality of linear portions 17 extending linearly and connected successively. Angles (02) of the linear portions 17 with respect to the tyre circumferential direction are larger axially outwardly. The second portions 10 configured as such increase the groove volumes and maintains the tread rigidity high in the tyre axial direction of the shoulder regions (sh) where a large lateral force is applied to. It should be noted that the second portion 10 may be formed in a smooth circular arc shape convex toward one side in the tyre circumferential direction (not shown), for example.

It is preferred that a length (L2) in the tyre axial direction of the second portion 10 is 20% or more and 30% or less of the tread width (Tw), for example. The second portions 10 configured as such improve the drainage performance of the shoulder regions (sh) and the middle regions (Mi).

Figure 5:
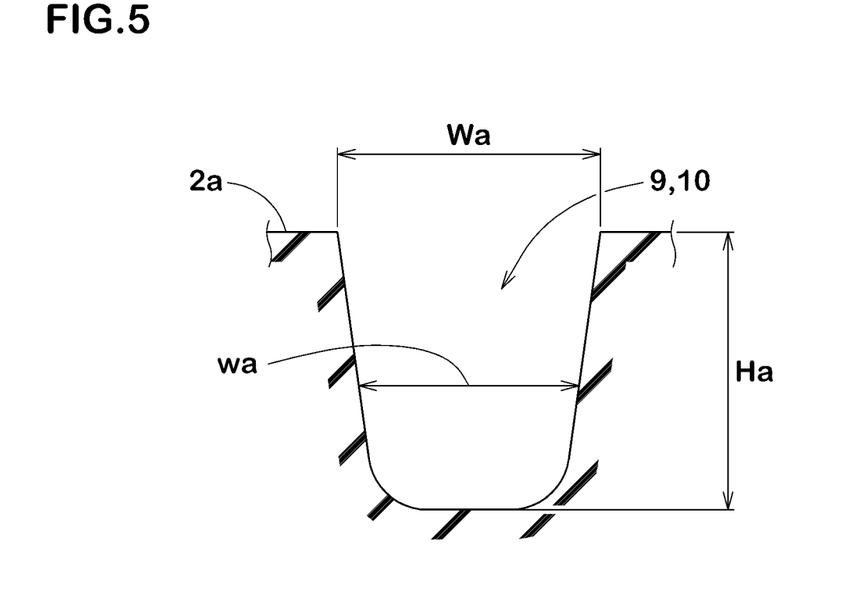
FIG. 5 a cross-sectional view taken along C-C line of FIG. 2.

FIG. 5 is a cross sectional view taken along C-C line of FIG. 2. In FIG. 5, the cross sectional view taken perpendicular to a longitudinal direction of the second portion 10 is shown. As shown in FIG. 5, the second portion 10 in the present embodiment has a portion in which a groove width (Wa) is gradually decreased radially inwardly. In the second portion 10, the groove width (Wa) is gradually decreased from the ground contacting surface (2a) to a groove bottom thereof, for example. It should be noted that the lateral cross section of the second portion 10 is not limited to such a shape, it may be configured to have a constant width portion in which the groove width (Wa) is constant along the tyre radial direction, and a portion connected with the constant width portion and in which the groove width (Wa) is gradually decreased (not shown), for example. Further, it is preferred that the first portions 9 have similar lateral cross sections as the second portions 10 (not shown).

In the first portions 9 and the second portions 10 configured as such, it is preferred that each of the groove widths (Wa) at the ground contacting surface (2a) is 4.0 mm or more and 6.0 mm or less. It is preferred that each of groove depths (Ha) is 3.5 mm or more and 9.5 mm or less. In this specification, the groove width (Wa) is an average value in the longitudinal direction of each of the portions 9 and 10.

As shown in FIG. 2, the third portions 11 are arranged so as to be in contact with a flat surface (not shown) when the tyre 1 is loaded with a tyre load of 1.5 kN with zero camber angle and in contact with the flat surface, for example. As a result, wear due to slipping in the crown region (Cr) and the middle regions (Mi) which are to be in contact with the ground during straightaway driving in a long driving time is decreased, therefore, the uneven wear resistance performance in the regions (Cr) and (Mi) is effectively improved.

The third portions 11 in the present embodiment are provided in the middle regions (Mi). The middle regions (Mi) have smaller tyre circumferential lengths than that of the crown region (Cr) and are the regions in which slipping is likely to occur. Thereby, slipping in the middle regions (Mi) is suppressed, therefore, the wear is further decreased, thereby, the difference in the wear amount between the middle regions (Mi) and the crown region (Cr) is decreased, therefore, uneven wear is suppressed.

It is preferred that a length (L3) (shown in FIG. 4) in the tyre axial direction of the third portion 11 is 5% or more of the tread width (Tw). The third portions 11 configured as such maintain the tread rigidity of the middle regions (Mi) high, therefore, excellent uneven wear resistance performance is exerted. In order to suppress decrease in the drainage performance, it is preferred that the lengths (L3) of the third portions 11 are each 15% or less of the tread width (Tw). The length (L3) of the third portion 11 in the present embodiment is smaller than the width (Wm) in the tyre axial direction of the middle region (Mi).

As shown in FIG. 4, the third portion extends linearly, for example. The third portions 11 configured as such make water flow smoothly in the inclined grooves 8, therefore, the drainage performance is maintained high. In this specification, the term "linear" means not only that a pair of groove walls (20e) and (20i) extending in the longitudinal direction of the third portion 11 is each formed of only a straight line, but a pair of the groove walls (20e) and (20i) are each formed by an arc having a radius of curvature (r) of 200 mm or more, for example. Both groove walls (20e) and (20i) of the third portion 11 extend in parallel with each other, for example.

In the present embodiment, the groove wall (20e) on one side of the third portion 11 is connected with a groove wall (21e) on one side of the first portion 9 and a groove wall (22e) on one side of the second portion 10 so as to each form a straight line. Thereby, smooth flow of water in the inclined grooves 8 is further ensured, therefore, the drainage performance is further improved. Furthermore, such a configuration suppresses a decrease in the tread rigidity in the vicinity of the inclined grooves 8. It should be noted that the groove wall (20e) on one side of the third portion 11 may be connected with only one of the groove wall (21e) on one side of the first portion 9 and the groove wall (22e) on one side of the second portion 10 (not shown).

The groove wall (20e) on one side is arranged on the toe-side in a tyre rotational direction (R), for example. In this case, the flow of water in the inclined grooves 8 becomes smoother, therefore, high drainage performance is exerted.

In the present embodiment, the groove wall (20i) on the other side of the third portion 11 is connected in a bent manner with a groove wall (21i) on the other side of the first portion 9 and a groove wall (22i) on the other side of the second portion 10. As just described, in the present embodiment, while making the groove width (Wb) of the third portion 11 small, the tread rigidity of at least the region adjacent to the groove wall (20e) on one side is maintained high, therefore, the uneven wear resistance performance is improved. The third portion 11 is connected with a gradually decreasing portion (9a) in which the groove width (Wa) of the first portion 9 gradually decreases toward the third portion 11, and a gradually decreasing portion (10a) in which the groove width (Wa) of the second portion 10 gradually decreases toward the third portion 11, for example. It should be noted that the groove wall (20i) on the other side of the third portion 11 may be connected with the groove wall (21i) on the other side of the first portion 9 and the groove wall (22i) on the other side of the second portion 10 in a smooth arc shape (not shown). Further, the groove wall (20e) on one side may be connected with the groove walls (21e) and (22e) on one side in a bent manner, and the groove wall (20i) may be connected with the groove walls (21i) and (22i) on the other side in a bent manner or in an arc shape (not shown).

It is preferred that an angle $\theta 3$ of the third portion 11 with respect to the tyre circumferential direction is 20 degrees or more and 40 degrees or less, for example.

In terms of the groove width, it is preferred that the third portion 11 is 60% or less of the first portion 9 and the second portion 10. The third portion 11 configured as such effectively suppresses slippage when the first portion 9 and the second portion 10 are in contact with the ground. If the groove width (Wb) of the third portion 11 is excessively small, the smooth flow of water in the inclined grooves 8 is hindered, therefore, it is possible that the drainage performance is deteriorated. Thereby, in terms of the groove width, it is preferred that the third portion 11 is 30% or more of the first portion 9 and the second portion 10.

In particular, it is preferred that the groove width (Wb) of the third portion 11 is 4 mm or less. Therefore, the groove walls (20e) and (20i) of the third portion 11 come into contact with each other to support each other upon contacting the ground, thereby, slippage is further suppressed. Therefore, the uneven wear resistance performance is improved.

In terms of the groove depth, it is preferred that the third portion 11 is 80% or more and 120% or less of the first portion 9 and the second portion 10. The third portion 11 configured as such maintains a smooth flow of water in the inclined grooves 8 and suppresses a decrease in the uneven wear resistance performance. The groove depth (Hb) (shown in FIG. 3) of the third portion 11 of the present embodiment is the same as the groove depths (Ha) (shown in FIG. 5) of the first portion 9 and the second portion 10.

In terms of the groove volume per area of the ground contacting surface (2a), it is preferred that the third portion 11 is 20% or more of the first portion 9 and the second portion 10. Further, it is preferred that the third portion 11 is 60% or less of the first portion 9 and the second portion 10. Thereby, the effects described above are effectively exerted.

The first portion 9, the second portion 10 and the third portion 11 are inclined in the same direction with respect to the tyre circumferential direction. Thereby, since the smooth flow of the water in the inclined grooves 8 is ensured, the drainage performance is maintained high.

Figure 6A:
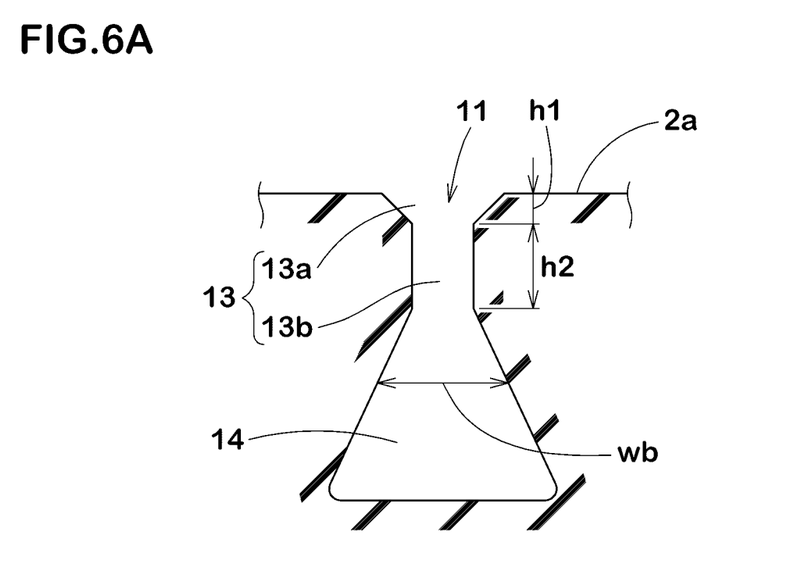
FIG. 6A a lateral cross-sectional view of the third portion according to another embodiment.
Figure 6B:
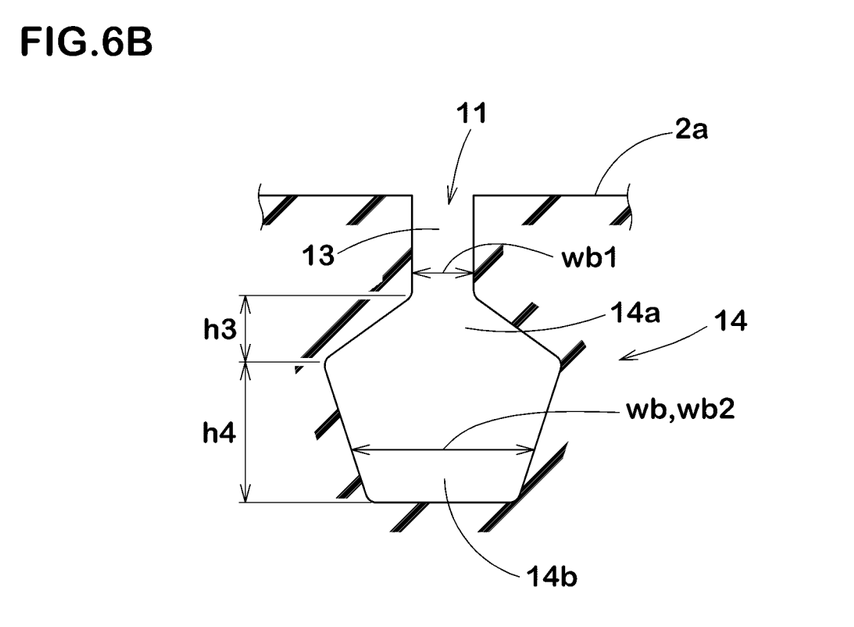
FIG. 6B a lateral cross-sectional view of the third portion according to yet another embodiment.

FIG. 6A is a lateral cross-sectional view of the third portion 11 according to another embodiment, and FIG. 6B is a cross-sectional view of the third portion 11 according to yet another embodiment. The same components as those of the third portion 11 of the present embodiment are denoted by the same reference numerals and description thereof is omitted.

As shown in FIG. 6A, in the third portion 11 in this embodiment, the outer portion 13 is formed so as to include a gradually decreasing portion (13a) in which a groove width (Wb) gradually decreases radially inwardly, and a constant width portion (13b) connected with the gradually decreasing portion (13a) and having the groove width (Wb) constant along the tyre radial direction. The maximum groove width of the gradually decreasing portion (13a) is formed smaller than the maximum groove width of the inner portion 14. A groove depth (h1) of the gradually decreasing portion (13a) is formed smaller than a groove depth (h2) of the constant width portion (13b). The outer portion 13 configured as such smoothly discharges more water than the outer portion 13 of the present embodiment.

In this embodiment, the groove walls of the gradually decreasing portion (13a), the constant width portion (13b), and the inner portion 14 extend linearly. It should be noted that it is not limited to such a configuration, the groove walls of the gradually decreasing portion (13a), the constant width portion (13b), and the inner portion 14 may extend in a wave shape or an arc shape, for example.

As shown in FIG. 6B, in the third portion 11 of this embodiment, the inner portion 14 is formed to have a pentagonal cross section. The inner portion 14 of this embodiment includes a gradually increasing portion (14a) in which the groove width (Wb) gradually increases radially inwardly, and a gradually decreasing portion (14b) connected with the gradually increasing portion (14a) and in which the groove width (Wb) gradually decreases. The groove width (Wb2) of the gradually decreasing portion (14b) is larger than a groove width (Wb1) of the outer portion 13. The third portion 11 configured as such maintains the drainage performance high.

In this embodiment, a groove depth (h3) of the gradually increasing portion (14a) is smaller than a groove depth (h4) of the gradually decreasing portion (14b). Since the inner portion 14 configured as such has a large groove volume, the drainage performance is maintained high. It should be noted that, in the inner portion 14, the groove depth (h3) of the gradually increasing portion (14a) may be greater (not shown) than the groove depth (h4) of the gradually decreasing portion (14b), for example. In this case, the tread rigidity on the side of the ground contacting surface (2a) is maintained high, therefore, slipping of the tread portion 2 is suppressed, thereby, the uneven wear resistance performance is excellent.

It should be noted that the third portion 11 is not limited to such an embodiment, the inner portion 14 may be circular or elliptical, for example.

Figure 7:
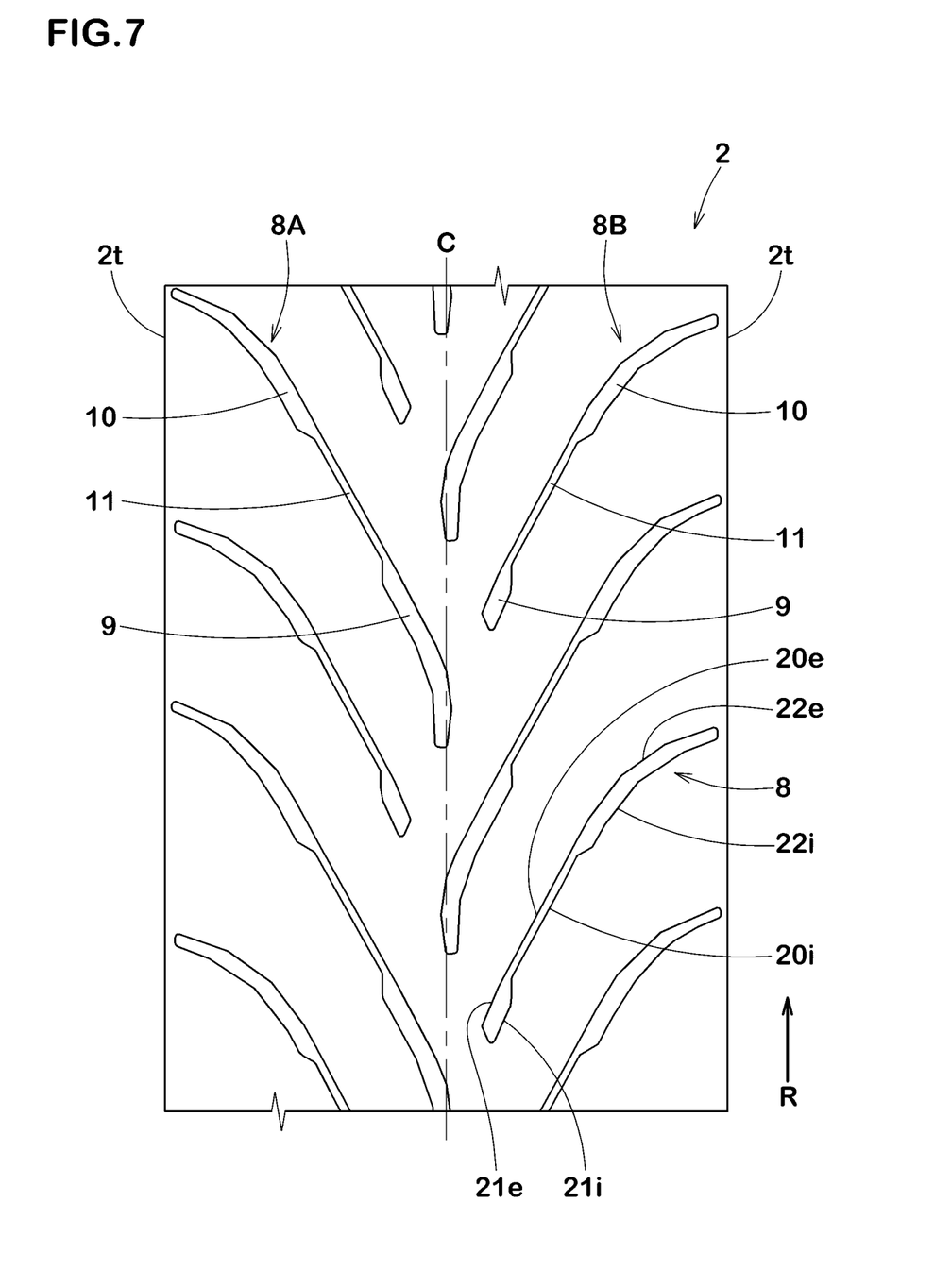
FIG. 7 a development view of the tread portion according to another embodiment.

FIG. 7 is a development view of the tread portion 2 according to another embodiment. The same components as those in the present embodiment are denoted by the same reference numerals, and the description thereof may be omitted. As shown in FIG. 7, the groove wall (20e) on one side may be arranged on a heel-side in the tyre rotational direction (R), for example. In this case, deformation of the groove wall (20i) on the other side at the time of contacting the ground is suppressed, therefore, contact between both groove walls (20e) and (20i) is effectively achieved. It should be noted that the rotational direction of the tyre 1 is not limited to the embodiments of FIG. 4 and FIG. 7.

While detailed description has been made of the tyre according to an embodiment of the present invention, the present invention can be embodied in various forms without being limited to the illustrated embodiment.

Working Examples (Examples)

Tyres having the basic structure shown in FIG. 1 and the basic tread pattern shown in FIG. 2 were made by way of test, and each of the test tyres was tested for the uneven wear resistance performance and the drainage performance. Common specifications of the test tyres and the test methods were as follows.

<Uneven Wear Resistance Performance>

Each of the test tyres was mounted on a front wheel of a motorcycle. A test rider drove the motorcycle on a dry asphalt road surface of a circuit course. After the test drive, wear amounts of the inclined grooves were measured and a difference between the wear amount in the crown region and the wear amount in the middle region was calculated. The results are indicated by an index based on Reference 1 being 100. The smaller numerical value shows more excellent uneven wear resistance performance.

Tyre size: 120/70ZR17 (front wheel), 200/55ZR17 (rear wheel)

Rim size: MT3.50×17 (front wheel), MT6.00×17 (rear wheel)

Tyre inner pressure: 250 kPa (front wheel), 290 kPa (rear wheel)

Displacement: 1000 cc

Driving distance: 5000 km

Average speed: 120 km/h

All the tyres mounted on the rear wheel had the same specifications.

Cross-sectional shape of First portion and second portion: FIG. 5

Reference 1: Formed only by First portion and second portion

Cross-sectional shape of Third portion of Reference 2: Formed only by outer portion shown in FIG. 3

<Drainage Performance>

By using an inside drum testing machine having a well-known structure with a diameter of 3 meters, braking force was measured while each of the test tyres was run on a drum surface covered by 5.0 mm depth of water. The braking force was measured twice when the drum rotational speed was 100 km/h and 70 km/h, then a difference between them was calculated to obtain the braking force. The results were indicated by an index based on the difference of the braking force of the Reference 1 being 100. The smaller the numerical value, the higher the braking force during running on a wet surface, which shows more excellent drainage performance.

Tyre size: 120/70ZR17

Longitudinal load: 1.5 kN

Tyre inner pressure: 250 kPa

The test results are shown in Table 1.

TABLE 1

| | Reference 1 | Example 1 | Example 2 | Reference 2 |
|---|---|---|---|---|
| Presence or Absence of Third portion | Absence | Presence | Presence | Presence |
| Figure showing shape of Third portion | — | FIG. 3 | FIG. 6a | — |
| Ratio (H1/Hb) [%] | — | 30 | 30 | — |
| Ratio (wb/wa) [%] | — | 40 | 40 | 40 |
| Ratio (Hb/Ha) [%] | — | 100 | 100 | 100 |
| Shape of outer portion | — | line-symmetric | line-symmetric | line-symmetric |
| Ratio (wb2/wb) [%] | — | 240 | 200 | 100 |
| Uneven wear resistance performance [index: smaller numerical value is better] | 100 | 80 | 85 | 80 |

TABLE 1-continued

|  | Reference 1 | Example 1 | Example 2 | Reference 2 |
|---|---|---|---|---|
| Drainage performance [index: smaller numerical value is better] | 100 | 102 | 100 | 120 |

From the test results, it can be confirmed that, in the tyres in Examples, the uneven wear resistance performance was improved while the drainage performance was maintained compared with the tyres in the References.

DESCRIPTION OF REFERENCE SIGNS 1 tyre
2 tread portion
2a ground contacting surface
8 inclined groove
9 first portion
10 second portion
11 third portion
13 outer portion
14 inner portion
Cr crown region
Sh shoulder region

The invention claimed is:

1. A tyre comprising a tread portion, wherein
the tread portion is provided with a plurality of inclined grooves inclined with respect to a tyre circumferential direction,
each of the inclined grooves consists of a first portion arranged on a crown region side, a second portion arranged on a shoulder region side, and a third portion connecting the first portion and the second portion,
the first portion has a groove width gradually decreasing from a lengthwise center hereof to both ends thereof,
the second portion has a groove width gradually decreasing from a lengthwise center thereof to both ends thereof,
the third portion extends linearly over an entire length thereof at a constant groove width in a ground contacting surface of the tread portion,
the constant groove width of the third portion is smaller than the groove width of the whole first portion except both ends thereof and the whole second portion except both ends thereof,
the third portion includes an outer portion arranged on the ground contacting surface side and an inner portion arranged radially inside the outer portion,
the inner portion has a groove width larger than the outer portion,
the inclined grooves include at least one first inclined groove and at least one second inclined groove having a length smaller than the first inclined groove, and
the first portion of the first inclined groove is inclined so that an angle thereof with respect to the tyre circumferential direction increases axially outwardly.

2. The tyre according to claim 1, wherein the groove width of the inner portion gradually increases radially inwardly.

3. The tyre according to claim 1, wherein in terms of a groove depth, the outer portion is 30% or more of the third portion.

4. The tyre according to claim 1, wherein in terms of a groove depth, the third portion is 80% or more and 120% or less of the first portion and the second portion.

5. The tyre according to claim 1, wherein a lateral cross section of the outer portion is line symmetric with respect to a groove center line of the third portion.

6. The tyre according to claim 1, wherein in terms of a groove width, the outer portion is 60% or less of the first portion and the second portion.

7. The tyre according to claim 1, wherein a length in a tyre axial direction of the third portion is 5% or more of a tread width.

8. The tyre according to claim 1, wherein
the first portion of the first inclined groove reaches a tyre equator, and
the first portion of the second inclined groove does not reach the tyre equator.

9. The tyre according to claim 1, wherein groove walls of the outer portion and the inner portion extend linearly, in an arc shape, or in a wavy shape.

10. The tyre according to claim 1, wherein
the tread portion includes the crown region and a pair of the shoulder regions arranged on both sides in a tyre axial direction of the crown region,
the inclined grooves include inclined grooves on one side and inclined grooves on the other side,
the inclined grooves on one side extend between the crown region and one of the shoulder regions on one side in the tyre axial direction,
the inclined grooves on the other side extend between the crown region and one of the shoulder regions on the other side in the tyre axial direction, and
the inclined grooves on one side and the inclined grooves on the other side are arranged alternately in the tyre circumferential direction.

11. The tyre according to claim 1, wherein
the inclined grooves include a plurality of the first inclined grooves and a plurality of the second inclined grooves, and
the first inclined grooves and the second inclined grooves are arranged alternately in the tyre circumferential direction.

12. The tyre according to claim 1, wherein the first portion of the first inclined groove has a length greater than the first portion of the second inclined groove.

13. The tyre according to claim 1, wherein the first portion of the second inclined groove extends linearly.

14. The tyre according to claim 1, wherein the second portion terminates within the shoulder region without being connected to a tread edge.

15. The tyre according to claim 1, wherein
the second portion is formed by a plurality of linear portions connected successively and each extending linearly, and
an angle of the second portion with respect to the tyre circumferential direction gradually, increases axially outwardly.

16. The tyre according to claim 1, wherein a groove wall on one side in the tyre circumferential direction of the third portion is connected with a groove wall on the one side in the tyre circumferential direction of the first portion, and a groove wall on the one side in the tyre circumferential direction of the second portion so as to each form a straight line or in a bent manner.

17. The tyre according to claim 16, wherein a groove wall on the other side in the tyre circumferential direction of the third portion is connected with a groove wall on the other side in the tyre circumferential direction of the first portion and a groove wall on the other side in the tyre circumferential direction of the second portion in a bent manner or in an arc shape.

18. The tyre according to claim 1, wherein
the outer portion of the third portion consists of a gradually decreasing portion and a constant width portion,
the gradually decreasing portion has a groove width gradually and continuously decreasing radially inward from the ground contacting surface, and
the constant width portion is arranged immediately inside the gradually decreasing portion in the tyre radial direction and extends radially inward at a constant groove width.

19. A tyre comprising a tread portion, wherein
the tread portion is provided with a plurality of inclined grooves inclined with respect to a tyre circumferential direction,
each of the inclined grooves consists of a first portion arranged on a crown region side, a second portion arranged on a shoulder region side, and a third portion connecting the first portion and the second portion,
the first portion has a groove width gradually decreasing from a lengthwise center hereof to both ends thereof,
the second portion has a groove width gradually decreasing from a lengthwise center thereof to both ends thereof,
the third portion extends linearly over an entire length thereof at a constant groove width in a ground contacting surface of the tread portion,
the constant groove width of the third portion is smaller than the groove width of the whole first portion except both ends thereof and the whole second portion except both ends thereof,
the third portion includes an outer portion arranged on the ground contacting surface side and an inner portion arranged radially inside the outer portion,
the inner portion has a groove width larger than the outer portion,
the second portion is formed by a plurality of linear portions connected successively and each extending linearly, and
an angle of the second portion with respect to the tyre circumferential direction gradually increases axially outwardly.

* * * * *